(12) United States Patent
Gupta

(10) Patent No.: US 8,462,889 B2
(45) Date of Patent: *Jun. 11, 2013

(54) OVERSAMPLING DIGITAL RECEIVER FOR RADIO-FREQUENCY SIGNALS

(75) Inventor: Deepnarayan Gupta, Hawthorne, NY (US)

(73) Assignee: Hypres, Inc., Elmsford, NY (US)

( * ) Notice: Subject to any disclaimer, the term of this patent is extended or adjusted under 35 U.S.C. 154(b) by 1531 days.

This patent is subject to a terminal disclaimer.

(21) Appl. No.: 11/966,897

(22) Filed: Dec. 28, 2007

(65) Prior Publication Data

US 2008/0101503 A1 May 1, 2008

Related U.S. Application Data

(63) Continuation-in-part of application No. 11/424,121, filed on Jun. 14, 2006, now Pat. No. 7,362,125, which is a continuation-in-part of application No. 11/360,749, filed on Feb. 23, 2006, now Pat. No. 7,443,719, and a continuation-in-part of application No. 11/243,020, filed on Oct. 4, 2005, now Pat. No. 7,508,230, and a continuation-in-part of application No. 11/243,022, filed on Oct. 4, 2005, now abandoned, and a continuation-in-part of application No. 11/243,019, filed on Oct. 4, 2005, now Pat. No. 7,680,474.

(51) Int. Cl.
 *H04L 27/06* (2006.01)

(52) U.S. Cl.
 USPC ........... 375/340; 375/260; 375/262; 375/267; 375/316; 375/324; 375/346; 375/347; 375/350

(58) Field of Classification Search
 USPC ................. 375/340, 338, 355, 238, 239, 242, 375/256, 257, 260, 262, 267, 286, 353; 329/311, 329/300, 304; 332/106; 341/126
 See application file for complete search history.

(56) References Cited

U.S. PATENT DOCUMENTS

| 6,865,639 | B2 | 3/2005 | Herr | |
|---|---|---|---|---|
| 6,917,537 | B2 | 7/2005 | Bunyk | |
| 6,960,929 | B2 | 11/2005 | Bedard | |
| 2002/0012138 | A1* | 1/2002 | Graves et al. | 359/118 |
| 2006/0038710 | A1* | 2/2006 | Staszewski et al. | 341/143 |
| 2006/0291589 | A1* | 12/2006 | Eliezer et al. | 375/302 |

OTHER PUBLICATIONS

Hashimoto, et al., "Implementation of a 4×4 Switch with Passive Interconnects", IEEE Trans. Appl. Supercon., vol. 15, No. 2, Jun. 2005, pp. 356-359.
Brock, et al., "Superconductor Digital Development for Software Radio", IEEE Commun, Mag., pp. 174-179, Feb. 2001.
Likharev, et al., "RSFQ Logic/MemoryFamily: A new Josephson junction technology for sub-THz digital systems", IEEE Trans. Appl. Supercond., vol. 1, pp. 3-28, 1991.

* cited by examiner

*Primary Examiner* — Dhaval Patel
(74) *Attorney, Agent, or Firm* — Steven M. Hoffberg; Ostrolenk Faber LLP

(57) ABSTRACT

A system and method for receiving a RF signal, comprising a device for digitizing, without prior alteration of frequency, an analog RF representation of each of a plurality of RF signals to produce a respective plurality of digital RF signals having a respective associated RF digital clock, the plurality of digital RF signals having a sufficiently high respective associated clock rate to preserve an information content of an information communication present in the analog RF representation; a switch matrix adapted to concurrently switch the plurality of digital RF signals and associated digital RF clock to ones of a plurality of digital signal processors; and a control adapted to selectively automatically control the concurrent switching of a plurality of digital signals and associated digital clock to the respective plurality of digital signal processors; wherein the digital signal processors produce processed representations of information contained in respective analog RF representations.

39 Claims, 11 Drawing Sheets

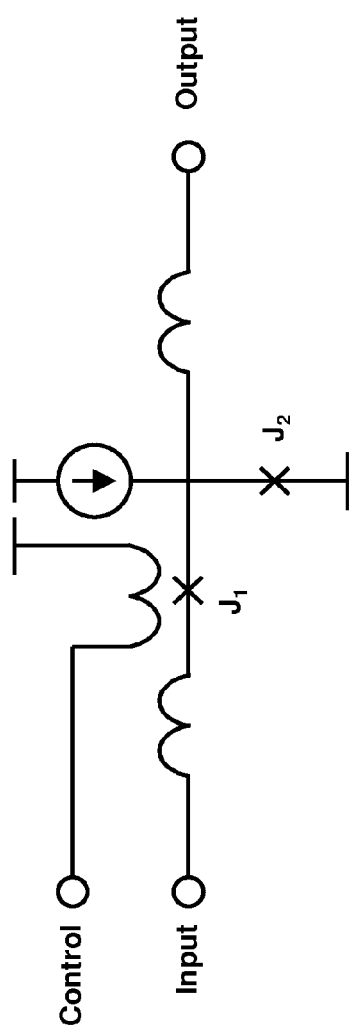
Fig. 2
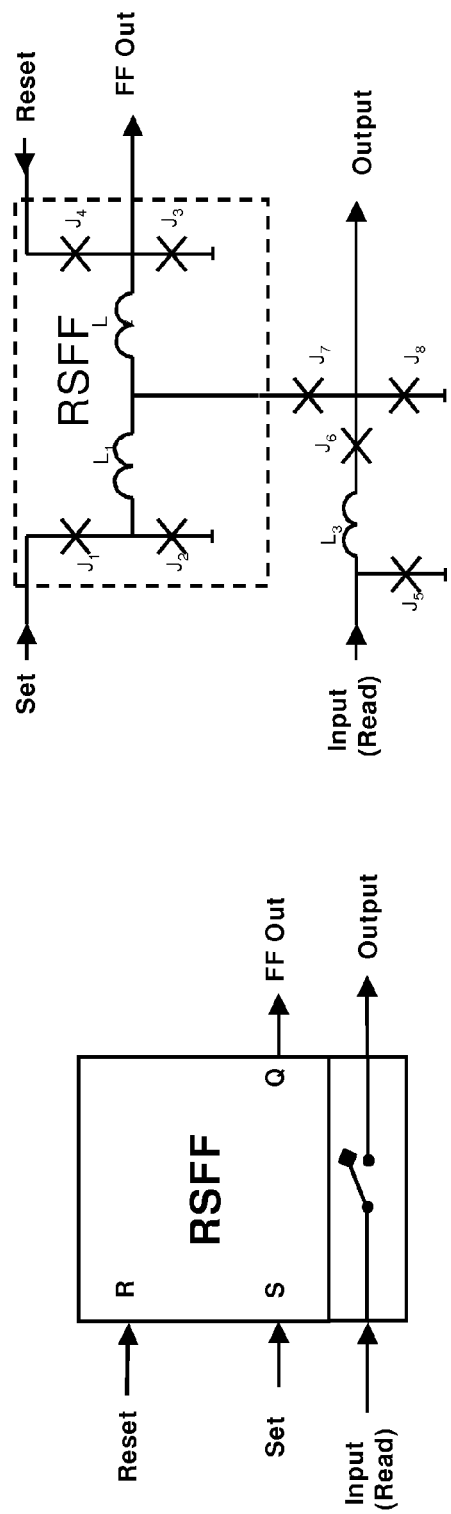
Fig. 3B
Fig. 3A

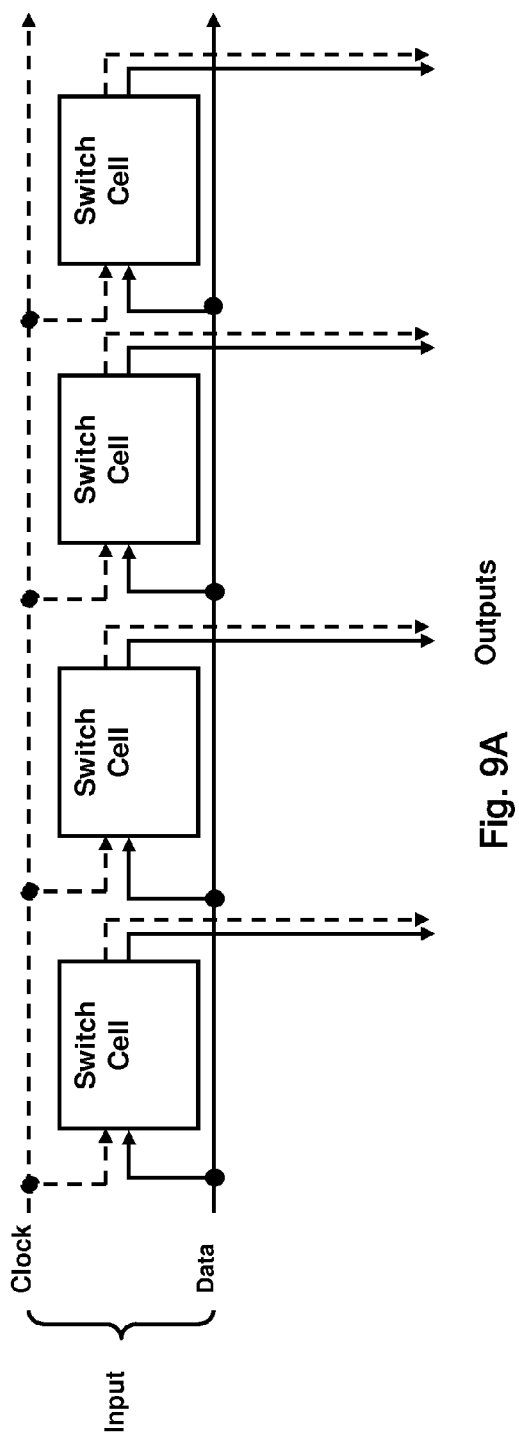
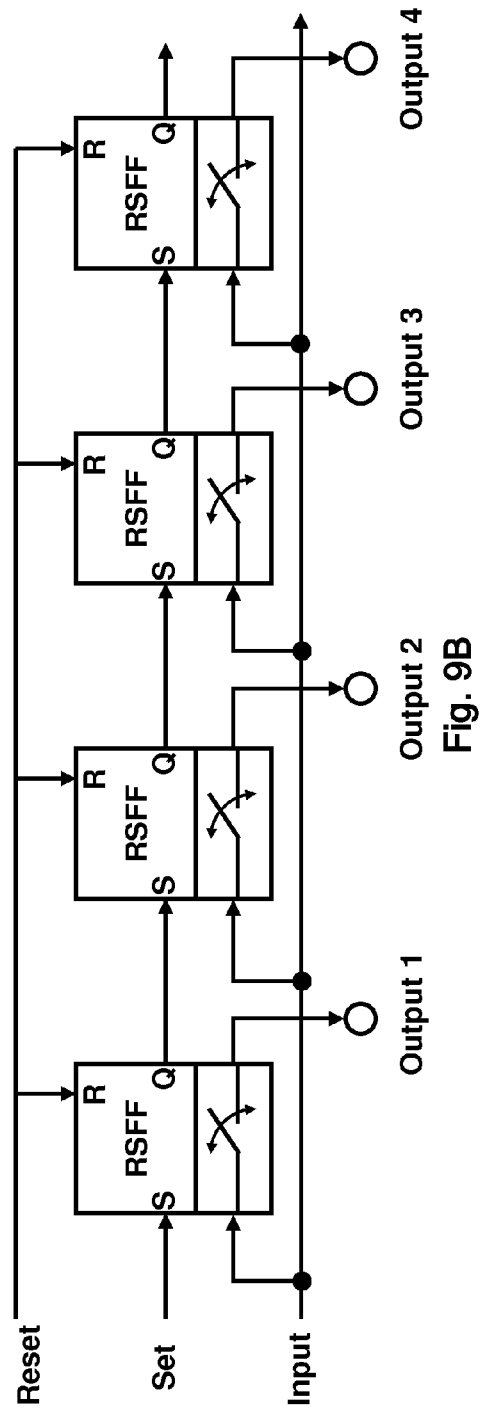
Fig. 9A
Fig. 9B

OVERSAMPLING DIGITAL RECEIVER FOR RADIO-FREQUENCY SIGNALS

CROSS REFERENCE TO RELATED APPLICATIONS

This application is a Continuation of U.S. patent application Ser. No. 11/424,121, filed Jun. 14, 2006, now U.S. Pat. No. 7,362,125 issued Apr. 22, 2008; which is a Continuation-in-part of U.S. patent application Ser. No. 11/360,749, filed Feb. 23, 2006, now U.S. Pat. No. 7,443,719 issued Oct. 28, 2008; and a Continuation-in-part of U.S. patent application Ser. No. 11/243,020, filed Oct. 10, 2005, now U.S. Pat. No. 7,508,230 issued Mar. 24, 2009; and a Continuation-in-part of U.S. patent application Ser. No. 11/243,019 filed Oct. 10, 2005, now U.S. Pat. No. 7,680,474 issued Mar. 16, 2010; and a Continuation-in-part of U.S. patent application Ser. No. 11/243,022, filed Oct. 10, 2005, now abandoned. Each of these applications is hereby incorporated by reference in its entirety.

BACKGROUND OF THE INVENTION

1. Field of the Invention

This invention relates to the field of switching circuits and, more particularly, for switching circuits for advanced digital radio receivers and transmitters.

2. Description of the Prior Art

A simple classic radio receiver consists of a single antenna coupled to a downconverter that extracts a single "baseband" channel. In a modern receiver, the baseband signal is digitized with an analog-to-digital converter (ADC) and further processed in the digital domain. A classic transmitter contains essentially the same components working in the reverse direction; a transceiver contains both a transmitter and a receiver packaged together.

A multi-band, multi-channel RF communications system (see FIG. 1a) can include multiple antennas, and can extract multiple baseband channels or groups of channels simultaneously. This requires a switch matrix, which permits distribution of various signals between each antenna (corresponding to each band) and one or more appropriate radio receiver channels. If the system is to be flexible and reconfigurable, it should be possible to redirect input signals to selected output channels.

The signal at the antenna is an analog waveform, even if it may be encoding a digital signal. In a conventional receiver system of the prior art, as illustrated in FIG. 1a, both the switch matrix and the channelizing receivers are analog components, and similarly for the transmitter. However, these band-specific precision analog components are often expensive and limited in their flexibility and reconfigurability. Furthermore, these analog switching systems have severe deficiencies in terms of losses, isolation, crosstalk, and ability to multicast.

For these reasons, the communications industry would like to move toward an approach known as "software-defined radio" (SDR) or "software radio", where all data processing is carried out in the digital domain, except right at the antenna itself. This requires ultrafast data converters, with sampling rates of tens of GHz and excellent linearity. ADCs with the requisite properties have recently been demonstrated, based on superconductor electronics using Josephson junctions, with circuit designs based on rapid-single-flux-quantum logic (RSFQ). It is natural that this data conversion be carried out right at the antenna, as illustrated in FIG. 1b. But in this case, the switching must also be carried out directly on the digital-RF signals. Furthermore, the precision and linearity of these signals can be maintained in the distribution network only if the sampling clock is distributed along with the data bits. This requires a new type of digital-RF switch matrix, which has not been reported before, and which is the subject of the present invention.

Furthermore, the digital-RF transceiver architecture allows natural partitioning between band-specific (analog) and band-independent (digital) components. Analog components, such as antennas and amplifiers are optimized for performance within a particular frequency band. Even data converters between analog and digital formats, ADCs and DACs, work best with designs that target specific frequency bands. Furthermore, an ADC or DAC optimized for a particular frequency band will typically have a particular sampling frequency (clock frequency $f_{clock}$) that is preferred for best performance. For example, a radio-frequency bandpass ADC designed for a center frequency f) may exhibit the greatest dynamic range for a sampling frequency that is four times the center frequency ($f_{clock}=4\times f$)). On the contrary, digital signal processing units, operating on numbers, are independent of the signal characteristics. This partitioning enables the true software radio paradigm by allowing full software programmability of the RF distribution network. Superconductor electronics are fast enough to digitize at multi-GHz RF and perform subsequent processing completely in the digital domain.

Switch matrices based on superconducting electronic circuits have been recently reported by several inventors. For example, see (1) U.S. Pat. No. 6,960,929, issued Nov. 1, 2005 by inventor Fernand D. Bedard, entitled Superconductive Crossbar Switch, (2) U.S. Pat. No. 6,917,537, issued Jul. 12, 2005 by inventor Paul I. Bunyk entitled RSFQ Batcher-Banyan Switching Network, (3) U.S. Pat. No. 6,865,639, issued Mar. 8, 2005 by inventor Quentin P. Herr entitled Scalable Self-Routing Superconductor Switch, and (4) Hashimoto et al., Implementation of a 4×4 Switch With Passive Interconnects, IEEE Trans. Appl. Supercon., vol 15, no. 2, June 2005, pp. 356-359.

However, none of these patents was designed for an application in RF communications, and none of these include switches which route the clock signal together with the data signal, which are two of several reasons this invention distinguishes over the prior art. See also the article by D. K. Brock, O. A. Mukhanov, and J. Rosa, "Superconductor Digital Development for Software Radio," IEEE Commun. Mag., pp. 174-179, February 2001, and K. K. Likharev and V. K. Semenov, "RSFQ Logic/Memory Family: A new Josephson junction technology for sub-THz digital systems", IEEE Trans. Appl. Supercond., vol. 1, pp. 3-28, 1991.

3. Problems of the Prior Art

The prior art switches have been expensive and limited in their flexibility and ability to reconfigure. In addition, they have severe deficiencies in terms of losses, isolation, cross talk and ability to multicast.

It is natural and desirable that data conversion be carried out right at the antenna, but, in such a case, the switching must also be carried out directly on the digital-RF signals. Further, the precision and linearity of these signals can be maintained in the distribution network only if the sampling clock is distributed along with the data bits. This requires and new type of digital-RF switch matrix which is the subject of the present invention.

SUMMARY AND OBJECTS OF THE INVENTION

A multi-carrier, multi-channel RF communication system requires a switch matrix to route various signals between a set of antennas and a set of radio transceivers. This can be carried out most efficiently in the digital domain, but requires the use of ultrafast circuits that can accurately process multi-GHz RF signals.

One aspect of the invention is directed to a switch matrix which is suitable for routing various signals between a set of antennas and a set of radio transceivers. The transceivers can be multi-carrier, multi-channel RF communication devices. The routing is carried out in the digital domain and uses ultra fast superconductive circuits that can accurately process multi-gigahertz RF signals. For best performance the basic switching cell must carry both the data bits and the sampling clock, where the sampling clock may be at different frequencies for signals from different RF bands distributed within the same switch matrix.

Preferred exemplary embodiments of the invention are implemented using ultra fast RSFQ superconducting logic elements.

It is therefore an object of the invention to provide a method for receiving a radio frequency signal, comprising digitizing, without prior alteration of frequency, an analog radio frequency representation of each of a plurality of radio frequency signals to produce a respective plurality of digital radio frequency signals having a respective associated radio frequency digital clock, the plurality of digital radio frequency signals having a sufficiently high respective associated clock rate to preserve an information content of an information communication present in the analog radio frequency representation; concurrently switching the plurality of digital radio frequency signals and associated digital radio frequency clock to ones of a plurality of digital signal processors; selectively automatically controlling the concurrent switching of a plurality of digital signals and associated digital clock to the respective plurality of digital signal processors; and producing, by the digital signal processors, processed representations of information contained in respective analog radio frequency representations.

The associated radio frequency clock for at least two of the respective digital radio frequency signals may be independent of each other.

At least one associated radio frequency digital clock may have a clock rate above a Nyquist rate for a radio frequency carrier of the analog radio frequency representation. Thus, the analog to digital converter may operate at frequencies in excess of 350 mega-samples per second, and, for example, at frequencies of 1, 5, 10, 20, 40 or even 100 giga-samples per second, with corresponding clock frequencies of 1, 5, 10, 20, 40, 100 GHz, or higher. Typically, the preferred oversampling range is at least 4 times the highest substantial-power frequency component in the band to be subsequently analyzed. Because there is no particular requirement for down-conversion or frequency translation of the signals, the band may be a "baseband" signal, that is, one in which energy components extend to DC or near 0 Hertz. Practically, a received radio frequency signal will not have such low frequencies, but in some cases may include signals in the kilohertz or higher range. Each analog signal coupler may therefore be adapted to couple a radio frequency signal within a band, the band having an upper range limit, the associated clock for the respective analog to digital converter operating above a Nyquist rate for the upper range limit.

As is known, if the frequency of a signal component having significant power exceeds the Nyquist rate, which is considered double the highest frequency, then there will be aliasing of the signal onto lower frequency components. While this is generally undesirable, in some cases, it is acceptable, especially where the signal has a frequency above the capabilities of the process, it has modulated information that can be extracted from the aliased signal, and when aliased, it does not interfere with reception of a signal of interest. Each analog signal coupler may therefore be adapted to couple a radio frequency signal within a band, the radio frequency signal comprising an information signal, the associated clock for the respective analog to digital converter operating above a minimum rate required to capture and digitally represent the information signal from the radio frequency signal.

At least two digital signal processors may be concurrently switched to process a respective digital radio frequency signal.

At least one of the respective digital radio frequency signals may comprises a parallel multiple binary bit digital representation of the representation of the analog radio frequency representation. At least one of the respective analog to digital converters may generate a parallel multiple binary bit digital representation of the representation of the radio frequency signal, the parallel multiple binary bit digital representation and associated clock being routed by the non-blocking switch matrix to at least one digital radio frequency signal processor. The multiple binary bit analog-to-digital converter may be, for example, a single bit delta-sigma architecture converter, which is processed to produce a multi-bit output, or an intrinsically multibit converter. Of course, a single bit converter and signal distribution architecture may also be employed.

A delay of a digital radio frequency signal and respective associated radio frequency digital clock may be matched to maintain synchronization. A delay of a digital radio frequency signal may be selectively controlled. At least two of the associated radio frequency digital clocks having different frequencies may be generated. A switching may occur to change an analog radio frequency representation routed to a digital signal processor dynamically in real time.

The plurality of analog radio frequency representations are received through respective separate antennas. At least two of the analog radio frequency representations may be in the same or different radio frequency bands, or in overlapping bands. If in the same or overlapping band, these signals may be, for example, subject to different digitization processing and/or analog or digital processing. Preferably, analog processing is minimized, to thereby eliminate sources of analog linear and non-linear distortion.

At least one digital signal processor may implement a digital channelizing receiver. A plurality of analog radio frequency representations within different radio frequency bands may be received through different antennas, and selectively concurrently switched to a plurality of channelizing receivers. At least one digital signal processor may comprise a channelizing receiver implementing at least one stage of digital down-conversion of a digital radio frequency signal from a frequency of the analog radio frequency representation to a lower frequency, while substantially retaining information modulated in the analog radio frequency representation. A plurality of information channels may be extracted from the digital radio frequency signals.

A digital radio frequency signal may be cross-correlated and/or autocorrelated at the clock rate.

It is also an object to provide a method for receiving signals, comprising generating digital data directly from a received radio frequency signal substantially without frequency translation, based on a digital data clock signal defined independently of the received signal and having a sufficiently high clock rate to preserve information modulated in the received radio frequency signal; and selectively directing a plurality of sets of digital data and an associated digital data clock, to a plurality of digital signal processors, each accepting the generated digital data at the high clock rate. The selectively directing may be non-blocking and multicasting.

An analog delay associated with a set of digital data and associated digital data clock may be independently tuned with respect to other sets of digital data and respective associated clocks.

It is a further object to provide a receiver adapted to receive radio frequency signals, comprising a plurality of digitizers, each adapted to digitize an analog radio frequency representation of each of a plurality of radio frequency signals, without prior alteration of frequency, to produce a respective plurality of digital radio frequency signals having a respective associated radio frequency digital clock, the plurality of digital radio frequency signals having a sufficiently high respective associated clock rate to preserve an information content of an information communication present in the analog radio frequency representation; and a switch matrix adapted to concurrently selectively switch, based on an automated control signal, the plurality of digital radio frequency signals and the associated plurality of digital radio frequency clocks to a plurality of digital signal processors adapted to process representations of information contained in respective analog radio frequency representations.

The associated radio frequency clock for at least two of the respective digital radio frequency signals may be independent of each other and/or at different frequencies.

At least one associated radio frequency digital clock may have a clock rate above a Nyquist rate for a radio frequency carrier of the analog radio frequency representation. At least one associated clock rate may be in excess of 1 gigahertz.

At least two digital signal processors may be concurrently switched to process a respective digital radio frequency signal.

At least one of the respective digital radio frequency signals may comprise a parallel multiple binary bit digital representation of the representation of the analog radio frequency representation.

A delay matching element adapted to match a delay of a digital radio frequency signal and respective associated radio frequency digital clock to maintain synchronization may be provided.

The switch matrix may dynamically route an analog radio frequency representation to a digital signal processor in real time. That is, while the receiver is receiving a signal, and without substantially interrupting the reception and digital processing of the signal, a switching state of the switch matrix may be modified. For example, an agile signal may be present in different bands, and therefore be received through different antennas over time. The switch matrix may therefore switch the respective analog-to-digital converter feeding a signal to a respective digital signal processor in real time, to track the signal as it changes band, while maintaining a state of the digital signal processing chain. As necessary, a switching transient may be suppressed by a digital control signal, though this may not be necessary. On the other hand, a signal may change its modulation scheme, requiring a different types of processing, and therefore the signal from an analog-to-digital converter may be routed to different digital signal processors over time. Since there may be many different signals present in each band, and each signal may require a different types of processing, the system is preferably multicasting to permit multiple digital signal processors to receive the output of each analog-to-digital converter concurrently as may be required to process the signals present. Therefore, preferably, the digital signal processors are capable of handling signals over a wide range of sampling rates, to allow such dynamic reconfiguration. The plurality of analog radio frequency representations may therefore be received through respective separate antennas, and at least two of the analog radio frequency representations may be in different radio frequency bands.

At least one digital signal processor may implement a digital channelizing receiver. A plurality of analog radio frequency representations within different radio frequency bands may be received through different antennas, and selectively concurrently switched to a plurality of channelizing receivers. At least one digital signal processor comprises a channelizing receiver implementing at least one stage of digital down-conversion of a digital radio frequency signal from a frequency of the analog radio frequency representation to a lower frequency, while substantially retaining information modulated in the analog radio frequency representation. At least one digital signal processor extracts a plurality of information channels from a respective digital radio frequency signal.

At least one digital signal processor may be adapted to cross correlate and/or autocorrelate a digital radio frequency signal at the clock rate. In the case of a single bit analog converter whose output is converted to a multibit representation and the sample rate correspondingly reduced, the cross correlation and/or autocorrelation may occur at this reduced rate.

It is another object to provide a receiver for receiving signals, comprising a convertor adapted to generate digital data directly from a received radio frequency signal substantially without frequency translation, based on a digital data clock signal defined independently of the received signal and having a sufficiently high clock rate to preserve information modulated in the received radio frequency signal; and a switch matrix adapted to selectively direct a plurality of sets of digital data and an associated digital data clock, to a plurality of digital signal processors, each accepting the generated digital data at the high clock rate. The switch matrix may be non-blocking and multicasting, and, for example, may be implemented as a Banyan network constructed from low temperature superconducting elements, such as niobium-based Josephson Junctions, to implement RSFQ circuits. At least one tunable analog delay device may be provided adapted to tune an analog delay associated with a first set of digital data and associated first digital data clock independently of a delay associated with a second set of digital data and associated second digital data clock.

BRIEF DESCRIPTION OF THE DRAWINGS

FIG. 2 shows a basic digital switch using Josephson junctions.

FIG. 3A is a block diagram of a digital switch based on a non-destructive readout (NDRO) cell.

FIG. 3B is a schematic diagram of the digital switch based on a non-destructive readout (NDRO) cell.

FIGS. 9A and 9B show implementations of a multicasting switch using RSFQ cells, respectively with and without clock accompanying a data line.

DETAILED DESCRIPTION OF THE INVENTION

I. Basic Switching Cells

Figure 1A:
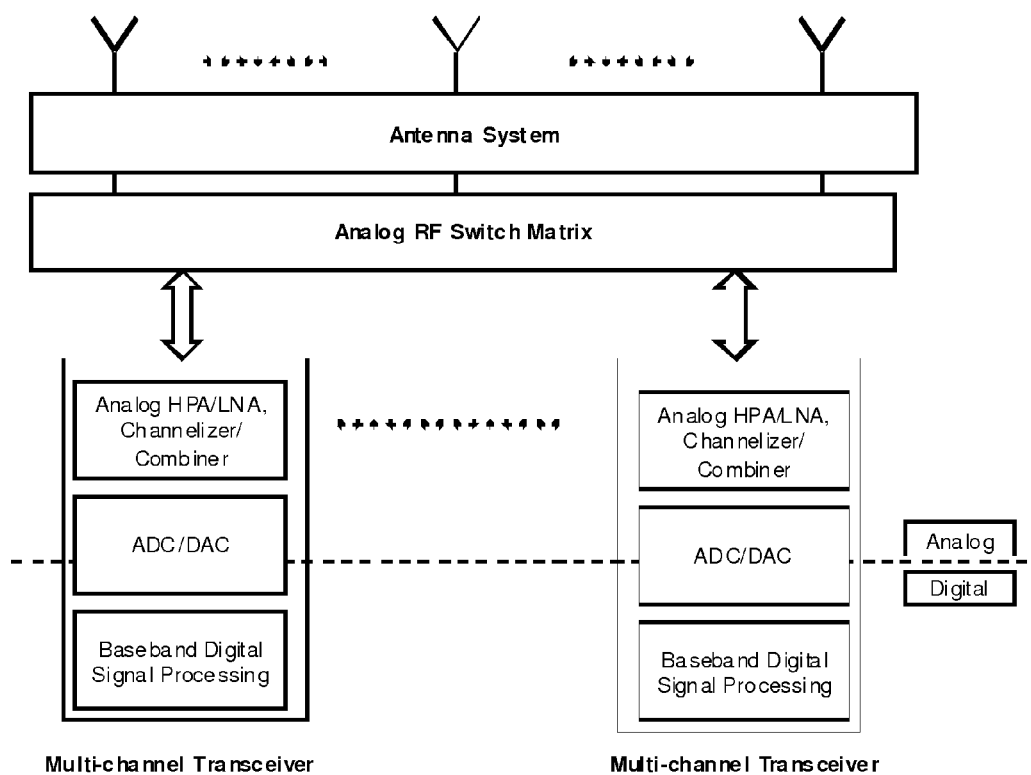
FIG. 1A is a block diagram of a multi-band, multi-channel RF transceiver system incorporating an analog switch matrix as known in the prior art.
Figure 1B:
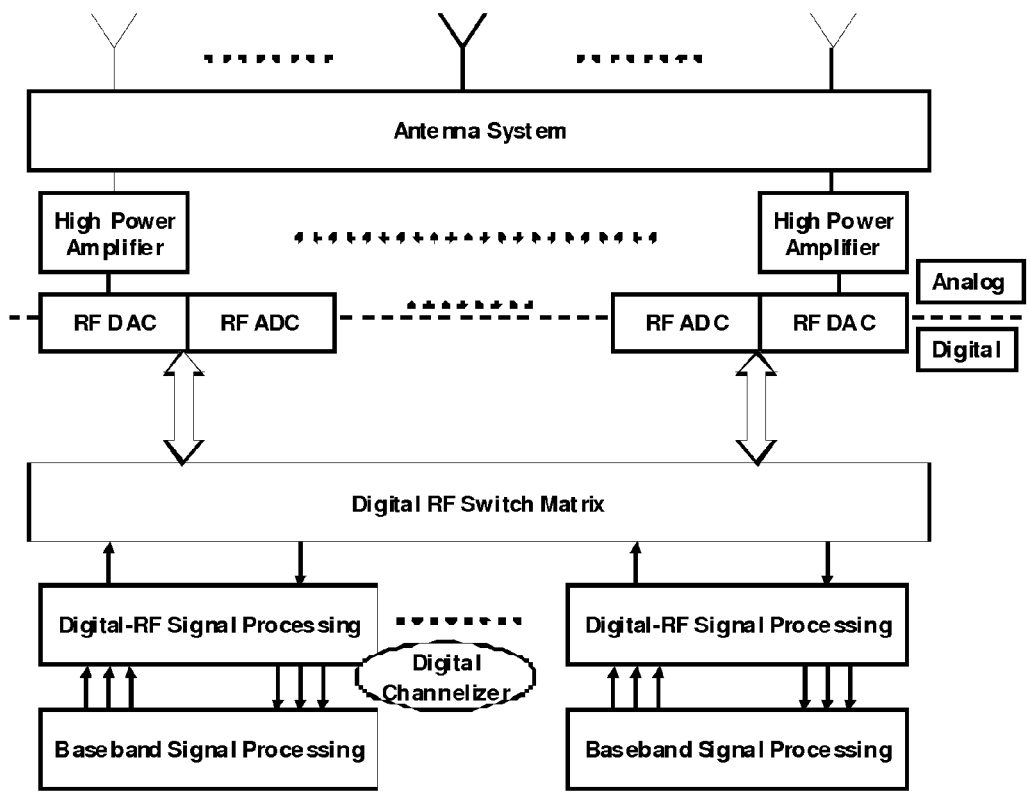
FIG. 1B is a block diagram of a multi-band, multi-channel RF transceiver system incorporating a new digital switch matrix for use with digital RF architectures in accordance with one aspect of the invention.

RSFQ logic, first developed by Likharev, Semenov, and Mukhanov, is built around Josephson junctions (JJs), with lossless propagation of single-flux-quantum (SFQ) voltage pulses, each corresponding to an integrated pulse of 2 mV-ps. Two different types of RSFQ switch cells are described, both of which are well known in the literature: the DC switch and the NDRO switch. In either case, the general principle of operation is the same. A JJ is biased such that an SFQ pulse will cause it to temporarily exceed its critical current and then return to its previous state, thus emitting another SFQ pulse. The switching time, which depends on the critical current density (Jc) of the JJ, is about 2 ps for the Jc=4.5 kA/cm$^2$. This ultrafast switching allows a very high rate (40 Gbps and higher) of SFQ digital signals. Whether or not a switch responds to an input SFQ pulse depends on its designed control conditions (DC bias, control current, or other concurrent digital events). For example, the state of the switch—whether it will pass or block a digital input—may be controlled by the state of a coupled flip-flop, where control information could be stored.

FIG. 2 shows a schematic diagram of a simple DC-switch with only 2 JJs, which is controlled by applying DC current to the control line.

FIGS. 3A and 3B show another digital switch element, called a non-destructive readout (NDRO) switch, where the control information is stored in a reset-set flip-flop (RSFF). (The NDRO switch with 8 JJs is more complex for a single switch, but is more easily scalable to large switch matrices.) An SFQ pulse applied to the Set input sets the RSFF to the '1' state. While it is in the '1' state, any pulse applied to the input will be read out as an SFQ pulse at the output synchronized to the clock input. This corresponds to the 'ON' (closed) state of the switch.

If a pulse is applied to the Reset input, the RSFF is reset to the '0' state. While it is in the '0' state, any pulse applied to the input will escape through J6 and no SFQ pulse will be produced at the output. This corresponds to the 'OFF' (open) state of the switch. One advantage of this type of switch is that only one external control line is required for each cell to write the desired switch states for the entire matrix. Thus the control for the entire matrix can be stored as a serial digital word. This is achieved by simply connecting the RSFFs of different switch cells as a shift register by applying the FF Out to the Set input of the next RSFF.

One needs to route both data and clock from each input source through the switch to desired output ports, for fully asynchronous operation. Of course, this can be accomplished by two switch cells which are manually set (reset) together. However a more elegant solution is part of one aspect of the invention by routing the clock signal through an NDRO switch and controlling propagation of the data stream through an RSFF (see FIG. 4 where the clock line is shown as a dashed line), thus reducing the JJ count necessary.

Figure 4:
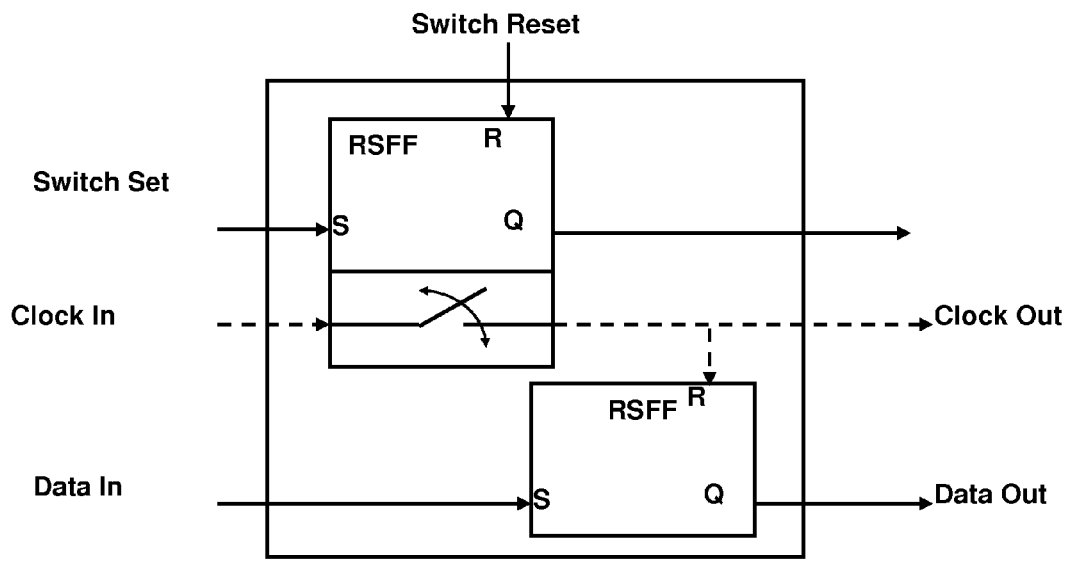
FIG. 4 is a novel switch cell for routing clock and data together.

FIG. 4 can be extended to accommodate a n-bit parallel data stream by replicating instance of the Data RSFF for each bit stream of the n-bit parallel data stream, with each RSFF being reset by the clock output signal.

II. Routing Switch Architecture

Figure 5:
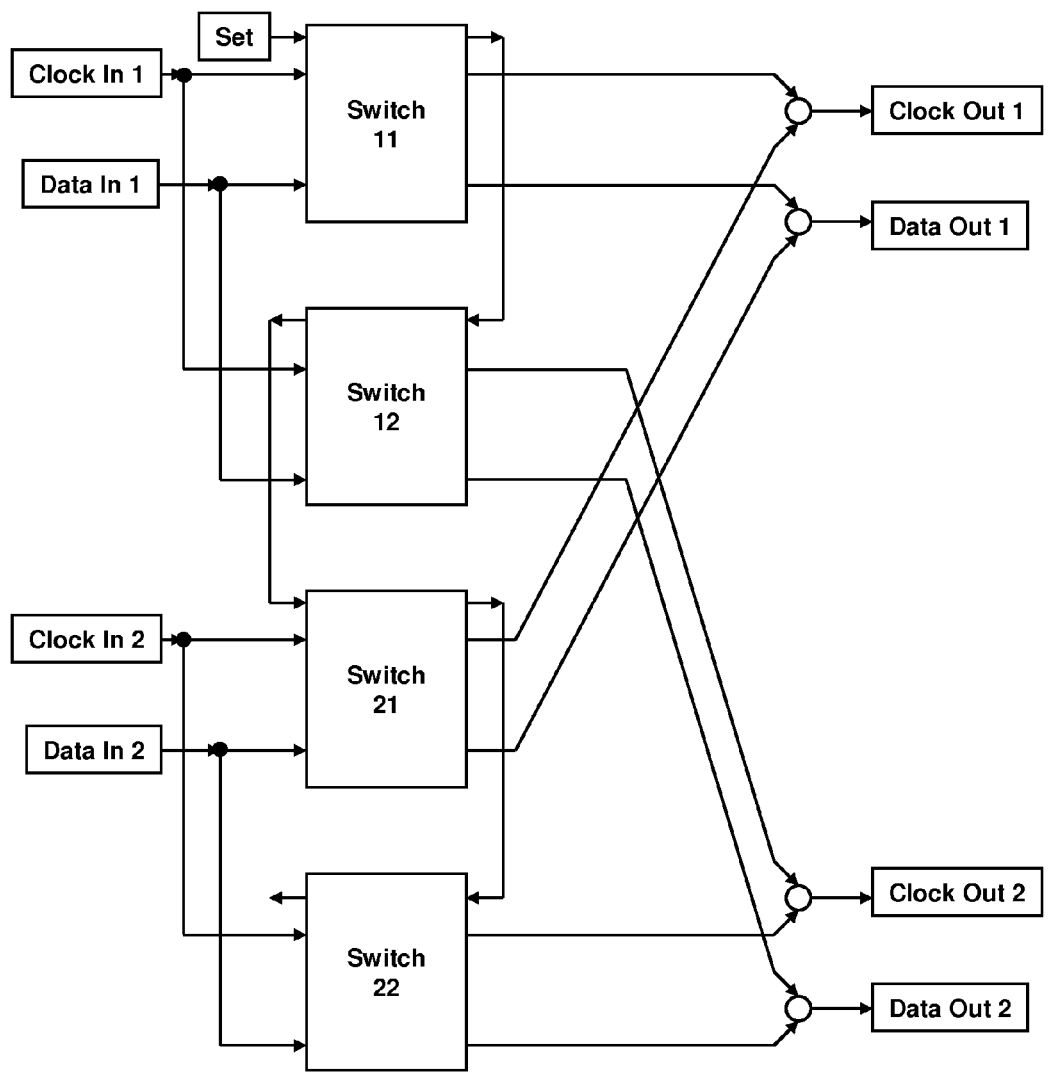
FIG. 5 is a block diagram of a 2×2 building-block for a 1:1 router matrix.

Consider a switch architecture where each input is routed only to a single output. (This constraint will be relaxed later.) To see how to scale up from a single switch, consider first a 2×2 building block (see FIG. 5). This is done with 4 switch cells. The data and clock signals from the first input are applied to Switch 11 and Switch 12 respectively, and the data and clock signals from the second input are applied to Switch 21 and Switch 22 respectively. The data and clock outputs from Switch 11 and Switch 21 are merged (combined) at the first output port, and the data and clock outputs from Switch 12 and Switch 22 are merged (combined) at the second output port. We have shown both clock and data paths, as well as the control (set) line, explicitly to illustrate the complexity of the design. We did not show the reset line, which will add to the routing complexity, but could be laid out similarly to the set lines in a way that should be obvious to one skilled in the art. Throughout the layout, maintaining accurate relative timing between paired clock and data signals is essential for correct operation.

Figure 6:
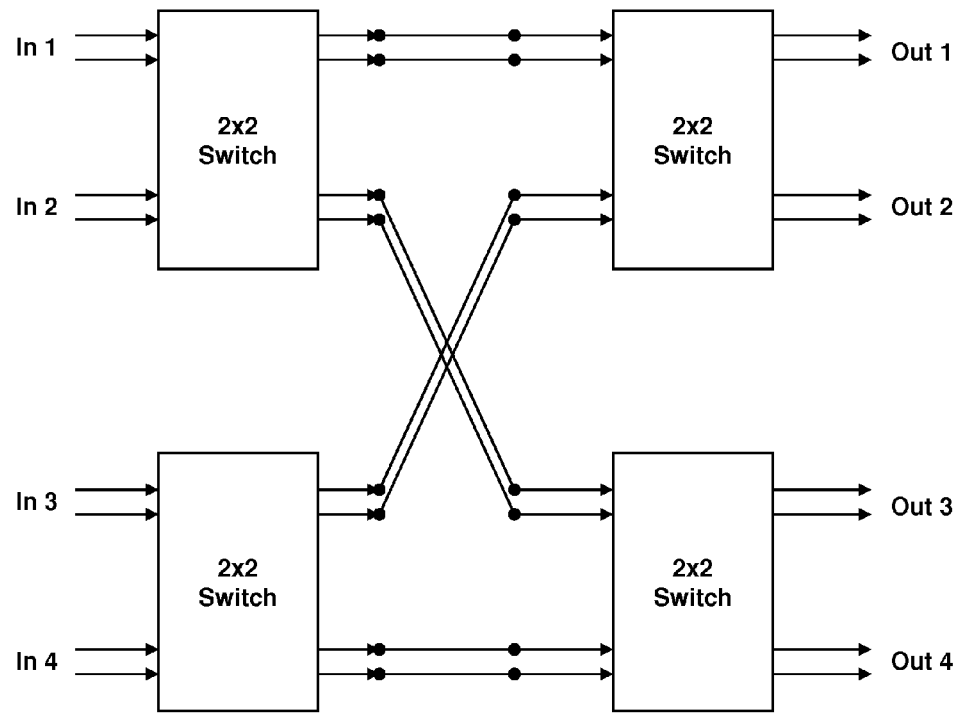
FIG. 6 is a block diagram of a 4×4 switch matrix consisting of four 2×2 building-blocks in a Banyan network.

Once a 2×2 switching network is complete, standard network approaches can be used to generate larger networks. For example, FIG. 6 shows the design of a 4×4 switch using the well-known, scalable Banyan network, with the double lines indicating routing of both data and clock signals together.

III. Architecture of Multicasting, Cross-Point Switch Matrix

Figure 8:
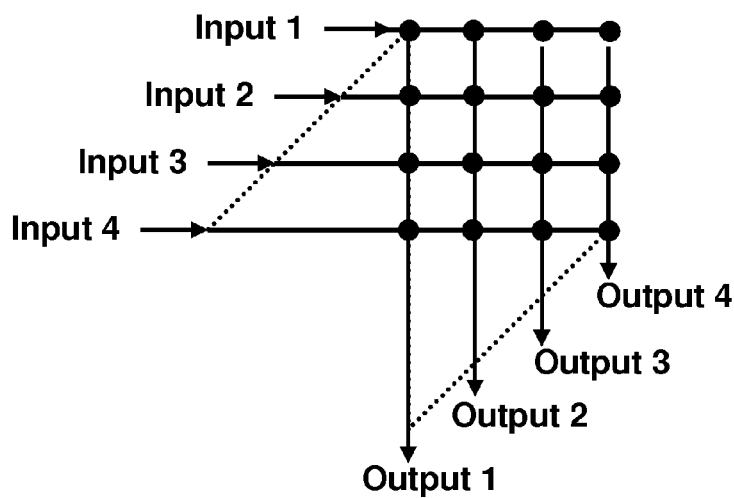
FIG. 8 shows an optional delay compensation network for a multicasting switch matrix of the type shown in FIG. 7.
Figure 7:
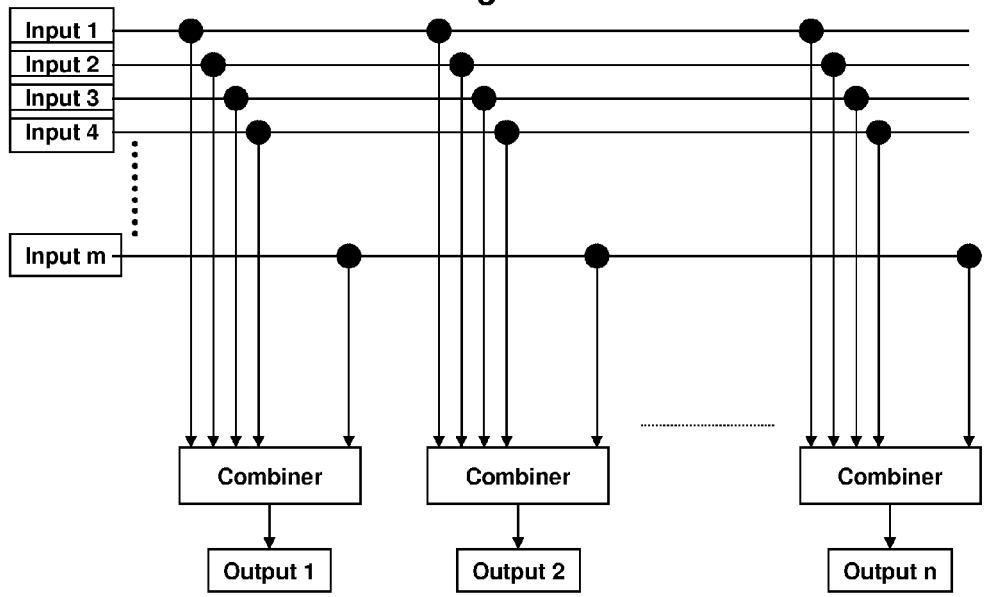
FIG. 7 shows a block diagram of a multicasting switch matrix in accordance with one aspect of the invention.

For some applications, it is necessary to copy one input to multiple outputs, or vice versa. The relevant switch architecture here is an M×N cross-point switch matrix that connects M inputs to N outputs (FIG. 7). Here each input propagates horizontally through a set of switch cells. If a switch is turned on, a copy of the input data stream is routed down the corresponding column towards an output port; there is no degradation of signal quality since digital copying is lossless. Any number of switches may be turned on in each row to produce copies of the input at multiple output ports. There is a potential problem of latency in this structure, since the signal propagation paths from an input port to different output ports is different. For most communications applications, such small differences in propagation delays (a nanosecond or less) do not matter. Delay compensation networks (shown as triangles in FIG. 8) can be added for applications, such as a network switch for multiprocessor supercomputers, that are sensitive to delay mismatches. Delay compensation can be achieved using passive lines of matched physical lengths or active transmission structures with matching delay times (such as tunable Josephson transmission lines).

We can use the same DC and NDRO switches (FIGS. 2 and 3 or the switch cell of FIG. 4) to build this multicasting switch matrix depending on weather the clock line accompanies the data line. The building block of this matrix is a row (FIGS. 9A and 9B).

The multicasting switch matrix architecture in FIG. 7 is composed of M×N switches as in FIG. 3. Each switch has a set and reset line that permits the routing to be dynamically modified. For many implementations, as suggested in FIG. 9B, the "set" lines may be connected in series, and the entire M×N array addressed by a single digital word. Given the very fast clock speed, the entire array can be reconfigured in a short time. For very large arrays, partial parallel addressing (of separate rows, for example) may be used to speed up the reprogramming rate. In this way, one may direct any input to any and all of the outputs, in a way that is rapidly reconfigurable.

IV. Integration of Switch Matrix into Transceiver System

Figure 10:
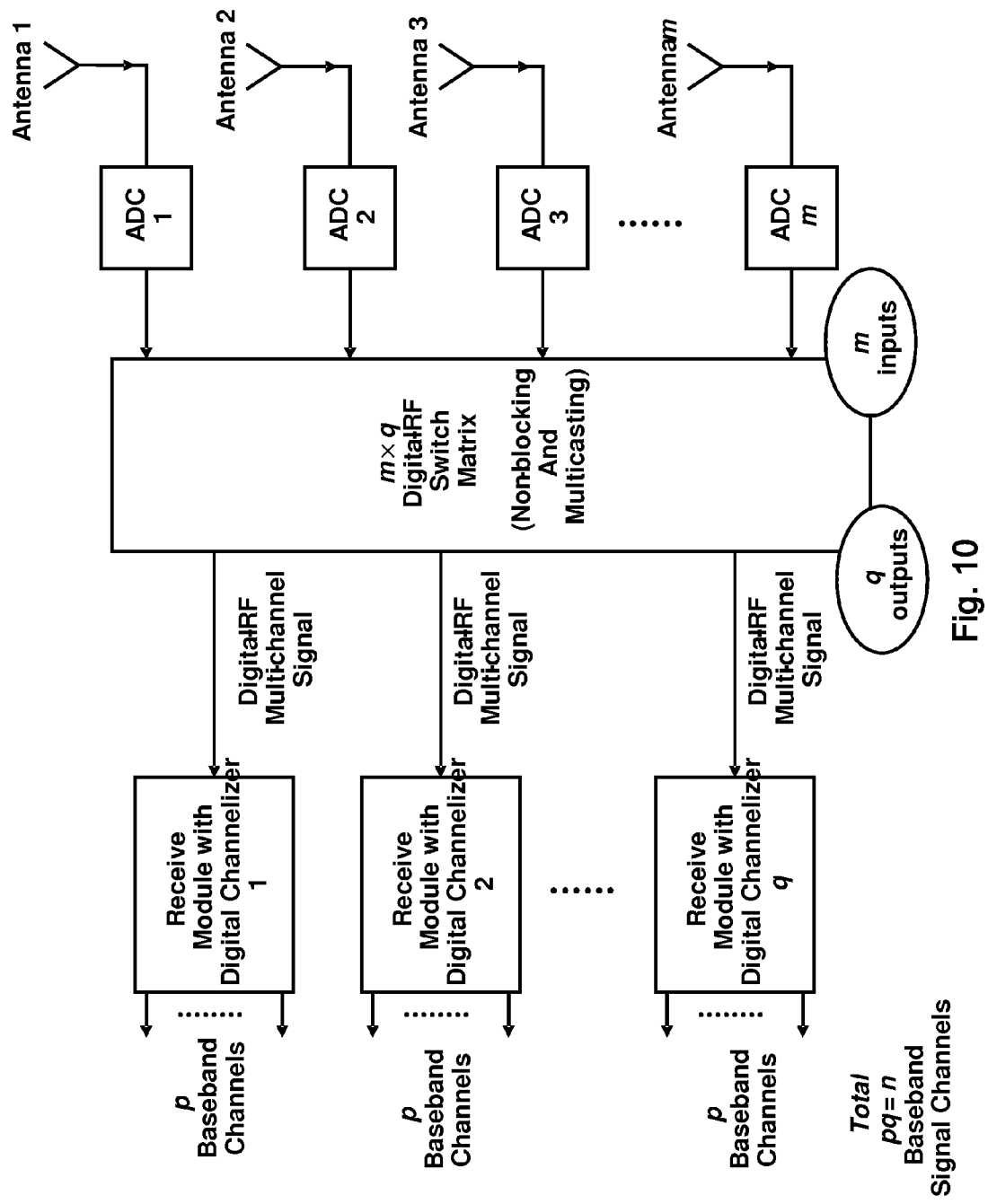
FIG. 10 is a block diagram of a digital-RF switch matrix for receiver systems showing size of the switching array.

To exemplify the advantages of digital routing of RF signals, let us examine the receive side in greater detail (FIG. 10). The analog RF input signals are digitized directly at RF using an ADC behind each antenna. Once the RF signals are in the digital domain, multiple copies can be generated without compromising signal power and quality. Therefore, the digital-RF signal can be simultaneously applied to a bank of digital channelizing units, each operating independently to extract a subband from a wide input band. For a multi-band system, digitized data streams from multiple ADC front-ends can be distributed to a bank of channelizers through a digital non-blocking, multicasting switch matrix. This architecture is scalable to an arbitrary number of channelizers (or more general digital processors) and banded antenna-ADC pairs. Furthermore, the digital switch matrix can be programmed in real time to dynamically reconfigure the communication system: changing band-to-channel allocation, cross-banding, etc.

In general, signal processing involves multiple steps, including multiple levels of channelization. For simplicity, here we have considered only the first level channelization function: extraction of a sub-band through mixing and filtering. This step requires digital-RF processing at clock speeds of 40 Gbps and beyond, and therefore, may be accomplished using superconductor electronics.

One special requirement for the switch matrix is its ability to support multiple input data rates. The ADCs may not share the same clock frequency. For example, the choice of clock frequency may depend on the center frequency of the band for convenient digital in-phase and quadrature (I & Q) mixing, which requires the clock to be 4 times higher or multiples thereof. An asynchronous or better-said multi-synchronous switch, routing both the clock and digitized data together, is essential to address this requirement. This ability to distribute digital signals with several different clock frequencies simultaneously within the same general-purpose switch matrix is a unique feature of one aspect of the invention.

Figure 11:
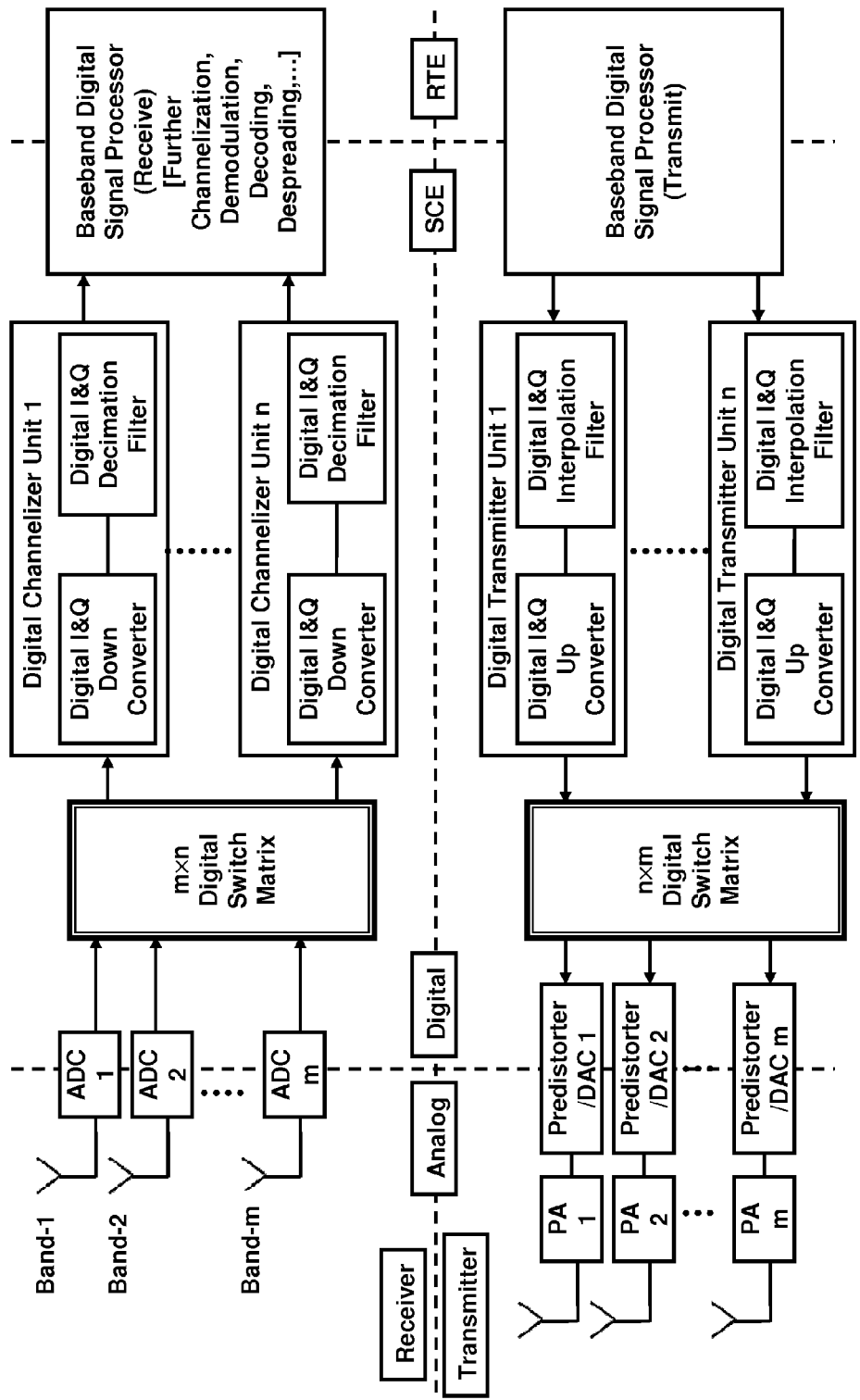
FIG. 11 shows a block diagram of a digital switch matrix included in both receiver and transmitter of a complete digital-RF transceiver system.

A general block diagram of a complete direct digital-RF communication system is shown in FIG. 11. A multi-band RF communication system consists of an antenna subsystem to capture electromagnetic energy in different RF bands and a transceiver subsystem to transmit and receive information from each RF band through a variety of signal processing steps (e.g., up/down-conversion, filtering, modulation/demodulation, coding/decoding, etc.). The goal is to dynamically assign the available signal processing resources to the input bands to meet the communication needs. This requires dynamic RF distribution and routing. The top half of FIG. 11 shows the receive side, where direct digitization of RF signals by analog-to-digital converters (ADCs) is followed by programmable digital routing to a bank of digital processing units. The bottom half shows the reciprocal transmit side. Here, multiple transmit signals are digitally synthesized and connected to digital-to-analog converters (DACs), coupled to digital-RF predistorters that linearize the RF transfer function of high power amplifiers (HPAs) directly.

A similar switch matrix may also be incorporated within a digital-RF transmitter system. In one embodiment of the invention, as indicated in the Multicasting Switch Matrix in FIG. 7, it may be desirable to direct more than one digital-RF input to be combined in the same output. Functionally, the multiple inputs may be added in a Combiner circuit, where this must be carried out in the Digital Domain in the digital-RF signals. Let us assume here that the clock frequencies of these signals to be added are the same. That is generally the case for signals designed for transmission using the same output antenna, which are within the same output band. Then the Combiner circuit can be implemented as simply a fast clocked Binary Adder, as has already been demonstrated in RSFQ technology. The outputs of the Binary Adder circuit may be passed along to a multi-bit Digital-to-Analog converter (DAC), the output of which can then be passed to an RF Power Amplifier, and then to a Transmission Antenna.

Figure 12:
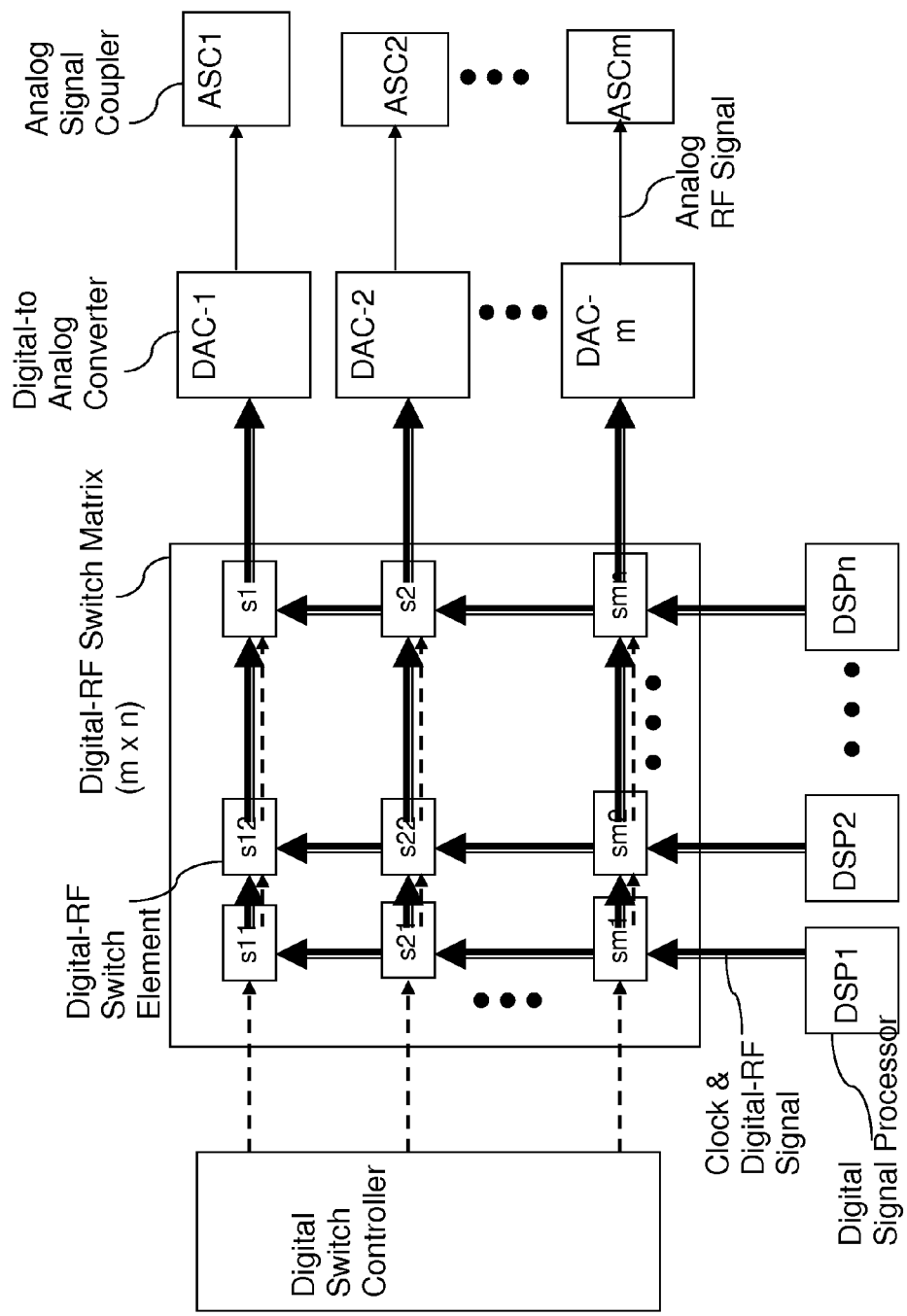
FIG. 12 shows a schematic diagram of a receiver.

FIG. 12 shows a receiver system in which a plurality (m) of analog signal couplers $ASC_1 \ldots ASC_m$ each provide an analog radio frequency signal to a respective analog-to-digital receiver ADC-1 . . . ADC-m, each of which provides an input to a switch matrix, having switch elements $s_{11} \ldots s_{mn}$. A plurality (n) of digital signal processors $DSP_1 \ldots DSP_n$ receive outputs from the switch matrix, and process the received digitized signals. The switch matrix is non-blocking, and, not shown in the figure, multicasting, so the number of digital signal processors may be the same or different than the number of analog-to-digital converters.

Figure 13:
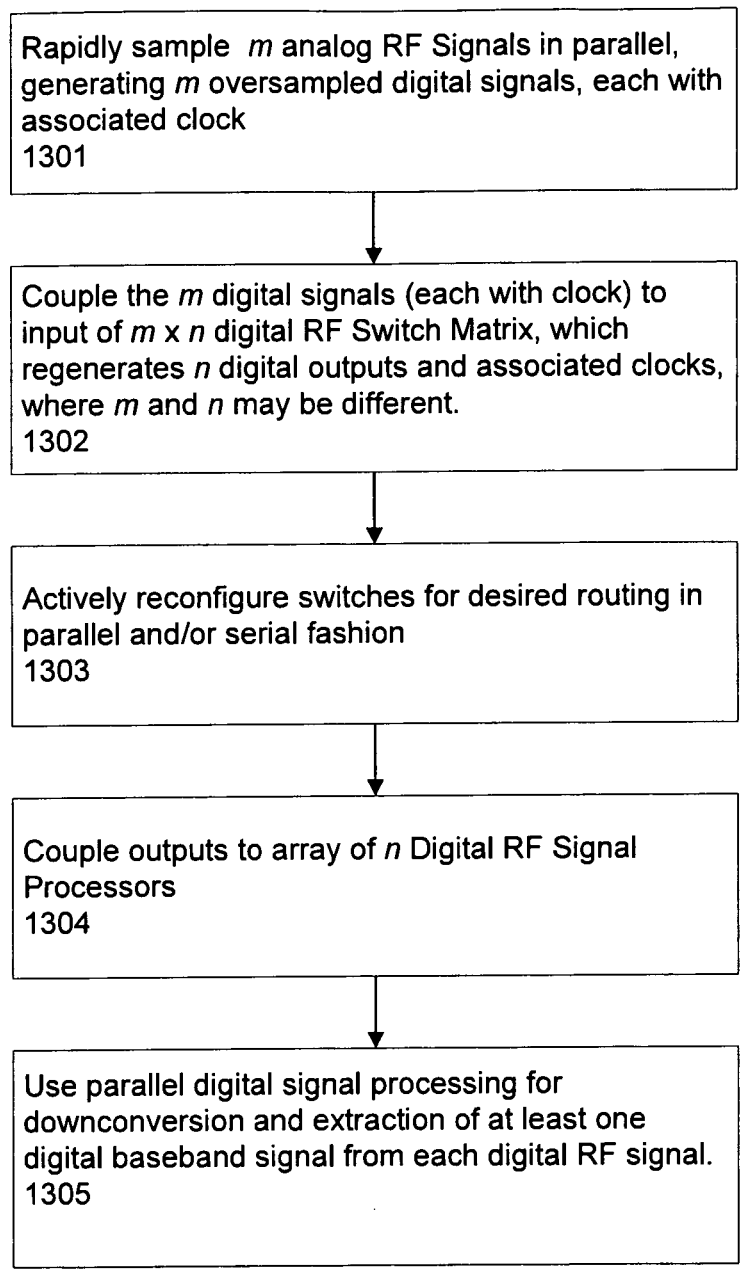
FIG. 13 shows a flowchart for a receiver method.

FIG. 13 shows a flowchart of a method according to the present invention. Initially, m analog RF Signals are rapidly sampled in parallel 1301, generating m oversampled digital signals, each with an associated clock. The m digital signals (each with clock) are coupled to respective inputs of an m×n digital RF Switch Matrix 1302, which regenerates n digital outputs and associated clocks, where m and n may be different. Switches for a desired routing may be actively reconfigured, in parallel and/or serial fashion 1303. Outputs of the switch matrix are then coupled to an array of n Digital RF Signal Processors 1304. Parallel digital signal processing is used for downconversion and extraction of at least one digital baseband signal from each digital RF signal 1305.

While various embodiments of the present invention have been illustrated herein in detail, it should be apparent that modifications and adaptations to those embodiments may occur to those skilled in the art without departing from the scope of the present invention as set forth in the following claims.

What is claimed is:

1. A method for receiving a radio frequency signal, comprising:

digitizing, without prior alteration of frequency, an analog radio frequency representation of each of a plurality of radio frequency signals to produce a respective plurality of digital radio frequency signals having a respective associated radio frequency digital clock, the plurality of digital radio frequency signals having a respective associated clock rate which avoids interference by aliasing of radio frequency signal components of the radio frequency signal onto the digitized analog radio frequency representation, to preserve an information content of an information communication present in the analog radio frequency representation;

concurrently switching the plurality of digital radio frequency signals and associated digital radio frequency clock to ones of a plurality of digital signal processors;

selectively automatically controlling the concurrent switching of a plurality of digital signals and associated digital clock to the respective plurality of digital signal processors; and producing, by the digital signal processors, processed representations of information contained in respective analog radio frequency representations.

2. The method according to claim 1, wherein the associated radio frequency clock for at least two of the respective digital radio frequency signals is independent.

3. The method according to claim 1, wherein at least one associated radio frequency digital clock has a clock rate above a Nyquist rate for a radio frequency carrier of the analog radio frequency representation.

4. The method according to claim 1, wherein at least one associated clock rate is in excess of 1 gigahertz.

5. The method according to claim 1, wherein at least two digital signal processors are concurrently switched to process a respective digital radio frequency signal.

6. The method according to claim 1, wherein at least one of the respective digital radio frequency signals comprises a parallel multiple binary bit digital representation of the representation of the analog radio frequency representation.

7. The method according to claim 1, further comprising the step of matching a delay of a digital radio frequency signal and respective associated radio frequency digital clock to maintain synchronization.

8. The method according to claim 1, further comprising the step of selectively controlling a delay of a digital radio frequency signal.

9. The method according to claim 1, further comprising the step of generating at least two of the associated radio frequency digital clocks having different frequencies.

10. The method according to claim 1, wherein a switching occurs to change an analog radio frequency representation routed to a digital signal processor dynamically in real time.

11. The method according to claim 1, wherein the plurality of analog radio frequency representations are received through respective separate antennas.

12. The method according to claim 1, wherein at least two of the analog radio frequency representations are in different radio frequency bands.

13. The method according to claim 1, wherein at least one digital signal processor implements a digital channelizing receiver.

14. The method according to claim 13, wherein a plurality of analog radio frequency representations within different radio frequency bands are received through different antennas, and selectively concurrently switched to a plurality of channelizing receivers.

15. The method according to claim 1, wherein at least one digital signal processor comprises a channelizing receiver implementing at least one stage of digital down-conversion of a digital radio frequency signal from a frequency of the analog radio frequency representation to a lower frequency, while substantially retaining information modulated in the analog radio frequency representation.

16. The method according to claim 1, further comprising the step of extracting a plurality of information channels from the digital radio frequency signals.

17. The method according to claim 1, further comprising the step of cross correlating a digital radio frequency signal at the clock rate.

18. A method for receiving signals, comprising:
generating digital data directly from a received radio frequency signal substantially without frequency translation, based on a digital data clock signal defined independently of the received signal and having a clock rate which substantially avoids aliasing interference of received radio frequency signal components onto the received radio frequency signal, to preserve information modulated in the received radio frequency signal; and
selectively directing a plurality of sets of digital data and an associated digital data clock, to a plurality of digital signal processors, each accepting the generated digital data at the high clock rate.

19. The method according to claim 18, said selectively directing is non-blocking and multicasting.

20. The method according to claim 18, further comprising the step of independently tuning an analog delay associated with a set of digital data and associated digital data clock.

21. A receiver adapted to receive radio frequency signals, comprising:
a plurality of digitizers, each adapted to digitize an analog radio frequency representation of each of a plurality of radio frequency signals, without prior alteration of frequency, to produce a respective plurality of digital radio frequency signals having a respective associated radio frequency digital clock, the plurality of digital radio frequency signals having a respective associated clock rate which avoids interference by aliasing of components of the respective radio frequency signal onto the respective digitized analog radio frequency representation, to preserve an information content of an information communication present in the analog radio frequency representation; and
a switch matrix adapted to concurrently selectively switch, based on an automated control signal, the plurality of digital radio frequency signals and the associated plurality of digital radio frequency clocks to a plurality of digital signal processors adapted to process representations of information contained in respective analog radio frequency representations.

22. The receiver according to claim 21, wherein the associated radio frequency clock for at least two of the respective digital radio frequency signals is independent.

23. The receiver according to claim 21, wherein at least one associated radio frequency digital clock has a clock rate above a Nyquist rate for a radio frequency carrier of the analog radio frequency representation.

24. The receiver according to claim 21, wherein at least one associated clock rate is in excess of 1 gigahertz.

25. The receiver according to claim 21, wherein at least two digital signal processors are concurrently switched to process a respective digital radio frequency signal.

26. The receiver according to claim 21, wherein at least one of the respective digital radio frequency signals comprises a parallel multiple binary bit digital representation of the representation of the analog radio frequency representation.

27. The receiver according to claim 21, further comprising a delay matching element adapted to match a delay of a digital radio frequency signal and respective associated radio frequency digital clock to maintain synchronization.

28. The receiver according to claim 21, further wherein at least two of the associated radio frequency digital clocks have different frequencies.

29. The receiver according to claim 21, wherein the switch matrix dynamically routes an analog radio frequency representation to a digital signal processor in real time.

30. The receiver according to claim 21, wherein the plurality of analog radio frequency representations are received through respective separate antennas.

31. The receiver according to claim 21, wherein at least two of the analog radio frequency representations are in different radio frequency bands.

32. The receiver according to claim 21, wherein at least one digital signal processor implements a digital channelizing receiver.

33. The method according to claim 32, wherein a plurality of analog radio frequency representations within different radio frequency bands are received through different antennas, and selectively concurrently switched to a plurality of channelizing receivers.

34. The receiver according to claim 21, wherein at least one digital signal processor comprises a channelizing receiver implementing at least one stage of digital down-conversion of a digital radio frequency signal from a frequency of the analog radio frequency representation to a lower frequency, while substantially retaining information modulated in the analog radio frequency representation.

35. The receiver according to claim 21, wherein at least one digital signal processor extracts a plurality of information channels from a respective digital radio frequency signal.

36. The receiver according to claim 21, wherein at least one digital signal processor is adapted to cross correlate a digital radio frequency signal at the clock rate.

37. A receiver for receiving signals, comprising:
a convertor configured to generate digital data representing an information content directly from a received radio frequency signal substantially without frequency translation, based on a digital data clock signal defined independently of the received radio frequency signal and having a clock rate which substantially avoids interference of received radio frequency signal components with the information content as a result of aliasing, to preserve information modulated in the received radio frequency signal; and
a switch matrix adapted to selectively direct a plurality of sets of digital data and an associated digital data clock, to a plurality of digital signal processors, each accepting the generated digital data at the high clock rate.

38. The receiver according to claim 37, wherein said switch matrix is non-blocking and multicasting.

39. The receiver according to claim 37, further comprising at least one tunable analog delay device adapted to tune an analog delay associated with a first set of digital data and associated first digital data clock independently of a delay associated with a second set of digital data and associated second digital data clock.

* * * * *